Jan. 27, 1970  H. R. NILSSON  3,491,730
ROTARY INTERNAL COMBUSTION ENGINE
Filed June 5, 1968  8 Sheets-Sheet 1

INVENTOR
Hans Robert Nilsson by
Greer Marechal Jr

Jan. 27, 1970   H. R. NILSSON   3,491,730
ROTARY INTERNAL COMBUSTION ENGINE
Filed June 5, 1968   8 Sheets-Sheet 3

INVENTOR
Hans Robert Nilsson
by
Green Maréchal Jr

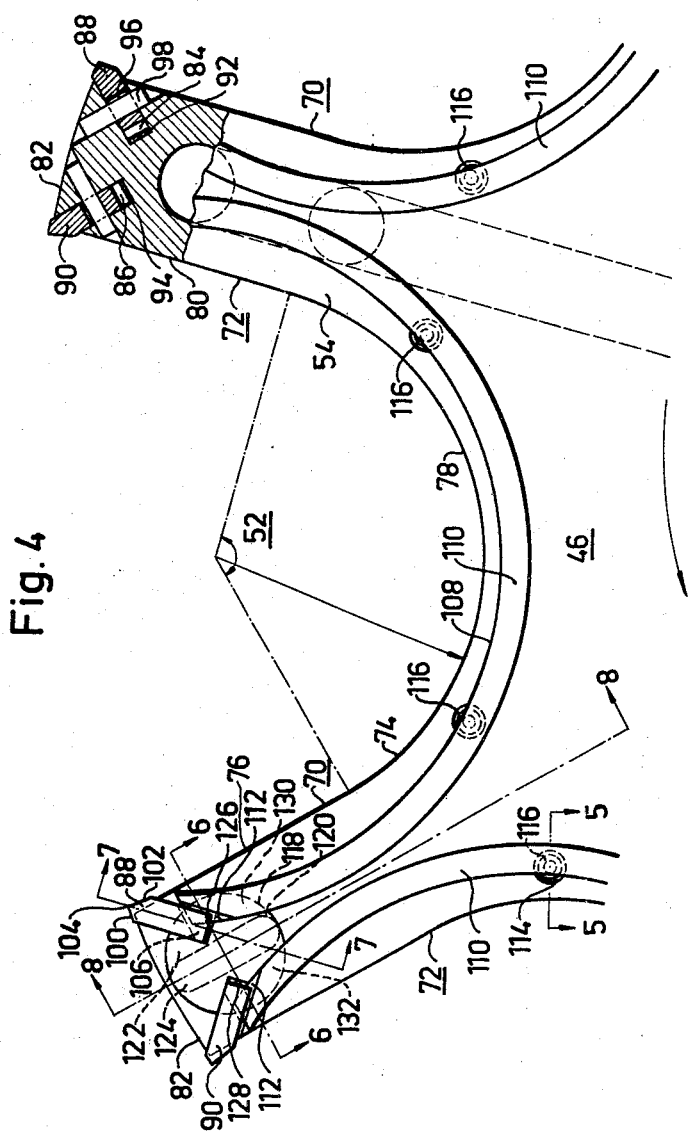

Jan. 27, 1970 H. R. NILSSON 3,491,730
ROTARY INTERNAL COMBUSTION ENGINE
Filed June 5, 1968 8 Sheets-Sheet 5

INVENTOR
Hans Robert Nilsson
by
Green Maréchal

Jan. 27, 1970     H. R. NILSSON     3,491,730
ROTARY INTERNAL COMBUSTION ENGINE
Filed June 5, 1968     8 Sheets-Sheet 6
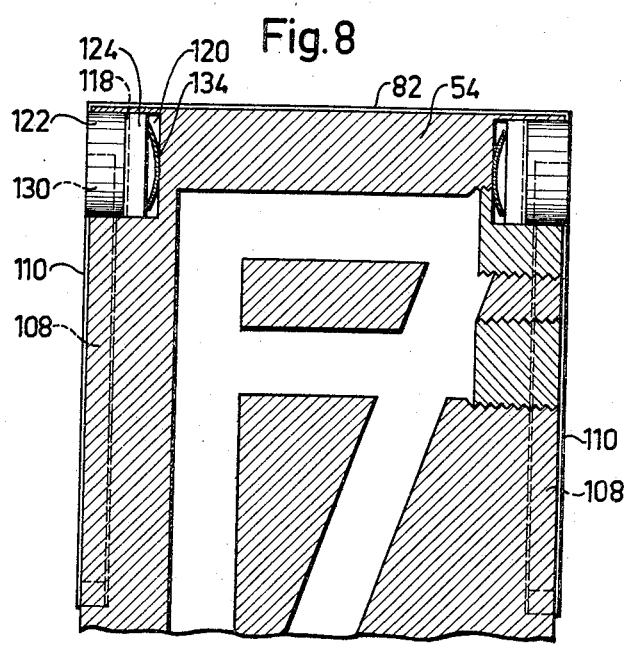
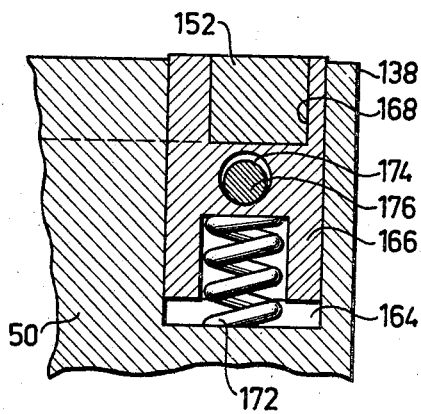
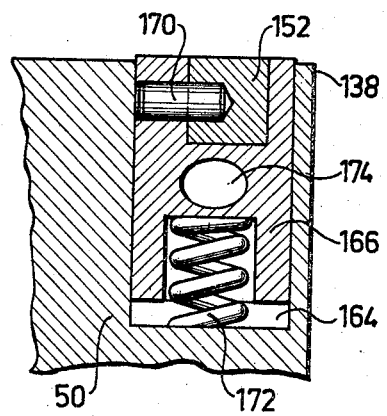
INVENTOR
Hans Robert Nilsson
by
Greer Marechal Jr.

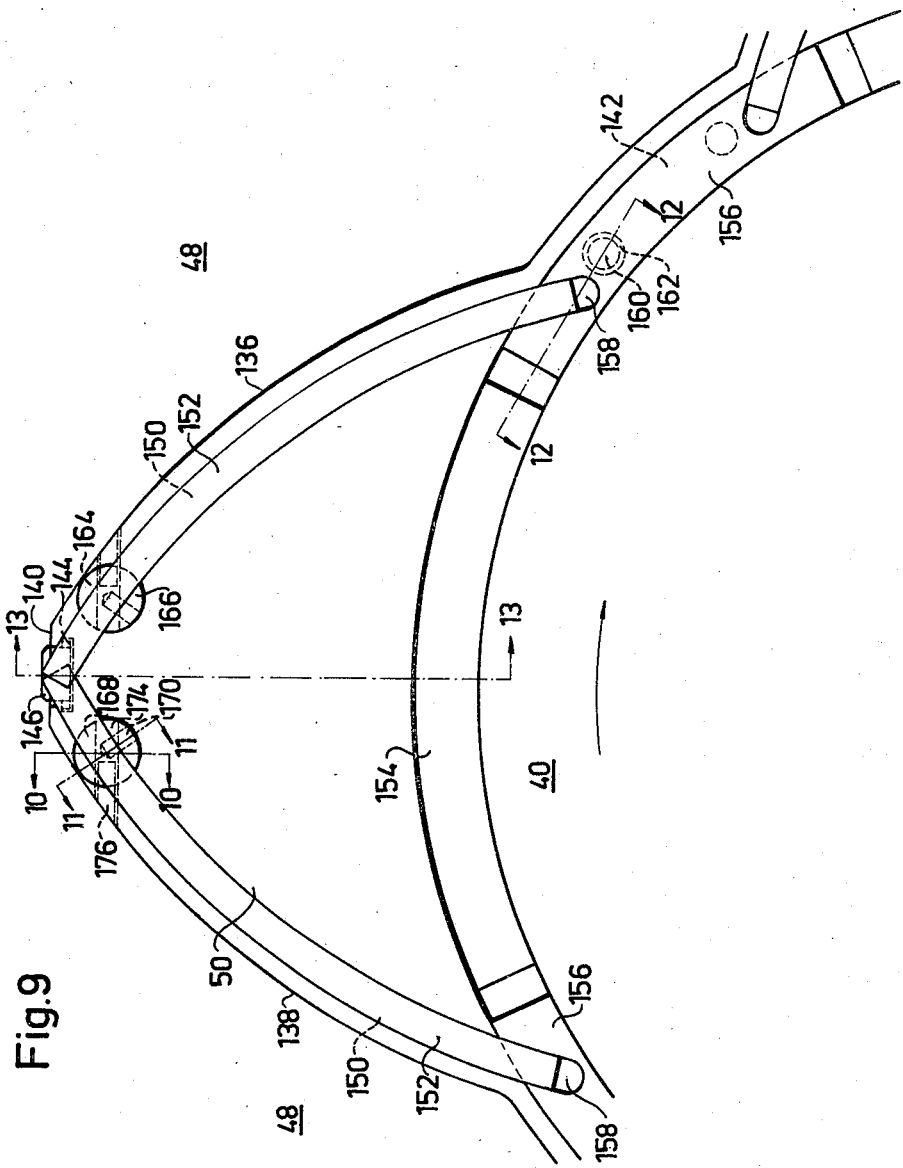

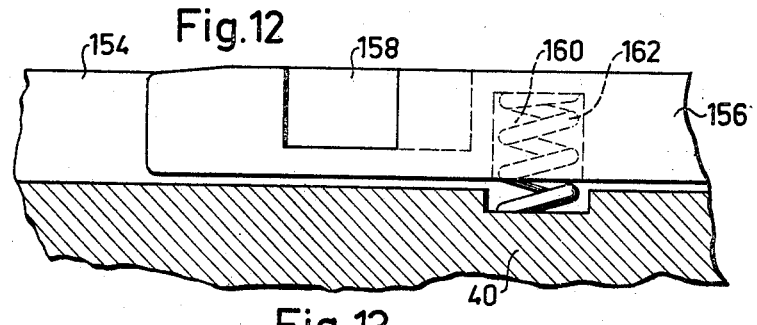
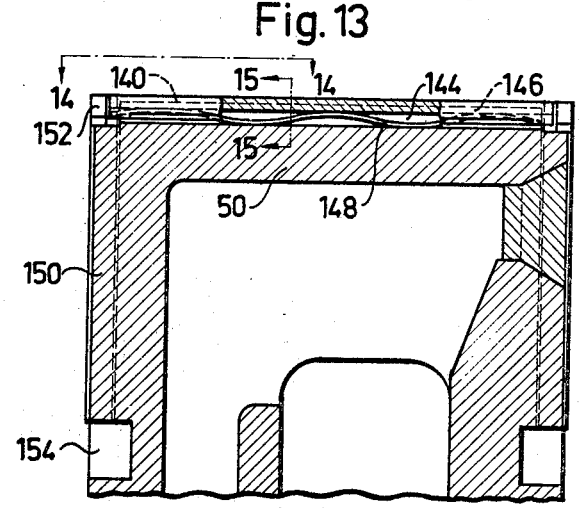
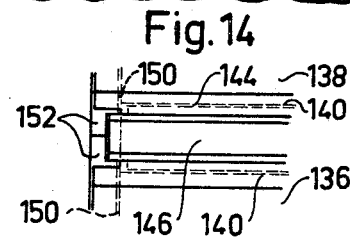
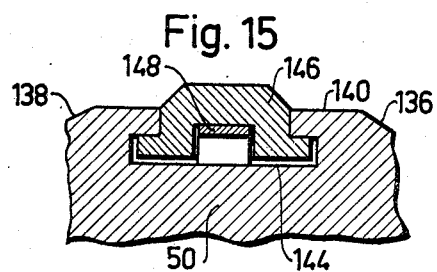

United States Patent Office 3,491,730
Patented Jan. 27, 1970

3,491,730
ROTARY INTERNAL COMBUSTION ENGINE
Hans Robert Nilsson, Ektorp, Sweden, assignor to Svenska Rotor Maskiner Aktiebolag, Nacka, Sweden, a corporation of Sweden
Filed June 5, 1968, Ser. No. 734,587
Claims priority, application Great Britain, June 7, 1967, 26,302/67
Int. Cl. F02b *55/08;* F04c *1/04*
U.S. Cl. 123—12                                                           14 Claims

ABSTRACT OF THE DISCLOSURE

Rotary internal combustion engine comprising two intermeshing grooved rotors and a stationary housing, providing continuously sealed working chambers for compression, combustion and expansion, having an element system for positive sealing of each working chamber.

---

This invention relates to rotary internal combustion engines of the positive displacement type and has particular reference to an engine comprising three main members, viz. two rotors rotatably mounted in a housing structure. Two of the members are provided with intermeshing grooves and lands to provide in sequence a pair of sealed inlet chambers, each constituted by a groove, a sealed working chamber formed by merging of the inlet chambers, which working chamber first diminishes in volume to a minimum value at maximum intermesh resulting in compression of the working fluid, and thereafter increasing in volume resulting in expansion of the working fluid, the working chamber is then divided into a pair of sealed outlet chambers, each constituted by a groove. The internal combustion of the engine takes place within the working chamber during a period when the volume of the working chamber is close to the minimum volume thereof.

An engine of this type is shown in our pending U.S. patent application 597,900.

The present invention relates especially to a sealing system for an engine of the type described above. This sealing system is of essential importance as it has been found that the internal leakage within such a machine has to be brought down to a minimum value and that a clearance between the cooperating members amounting to only 0.01 mm. is too much for the possibility to reach an acceptable efficiency.

Even though in the embodiment of the invention shown in this application as well as in the copending U.S. patent application 597,900 mentioned above the two rotors are shown to be the two grooved members it is also possible especially by using internal external gearing to form the housing structure as one of the grooved members. For this reason the three main members of the engine, the housing structure and the two rotors, are in the claims defined as the first, the second and the third member. In the shown embodiment the first member then means the housing structure, the second member means the primary rotor, and the third member means the secondary rotor.

The present invention more specifically relates to an engine of the type referred to above which is provided with a sealing system for positive sealing of the clearances along the lines of cooperation between the different members thereof. By using the sealing system according to the invention the leakage within the engine can be brought down to such a small value that it is acceptable from efficiency point of view. The details of the invention will be apparent as this specification proceeds.

Figure 1:
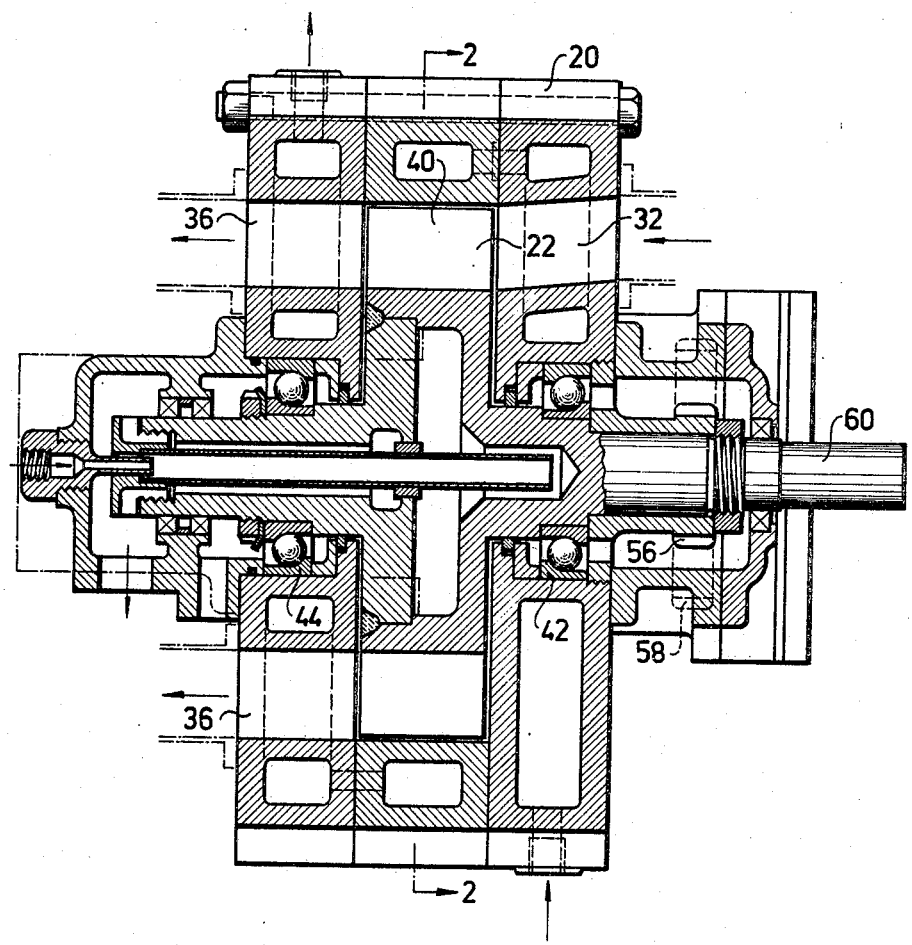
Figure 2:
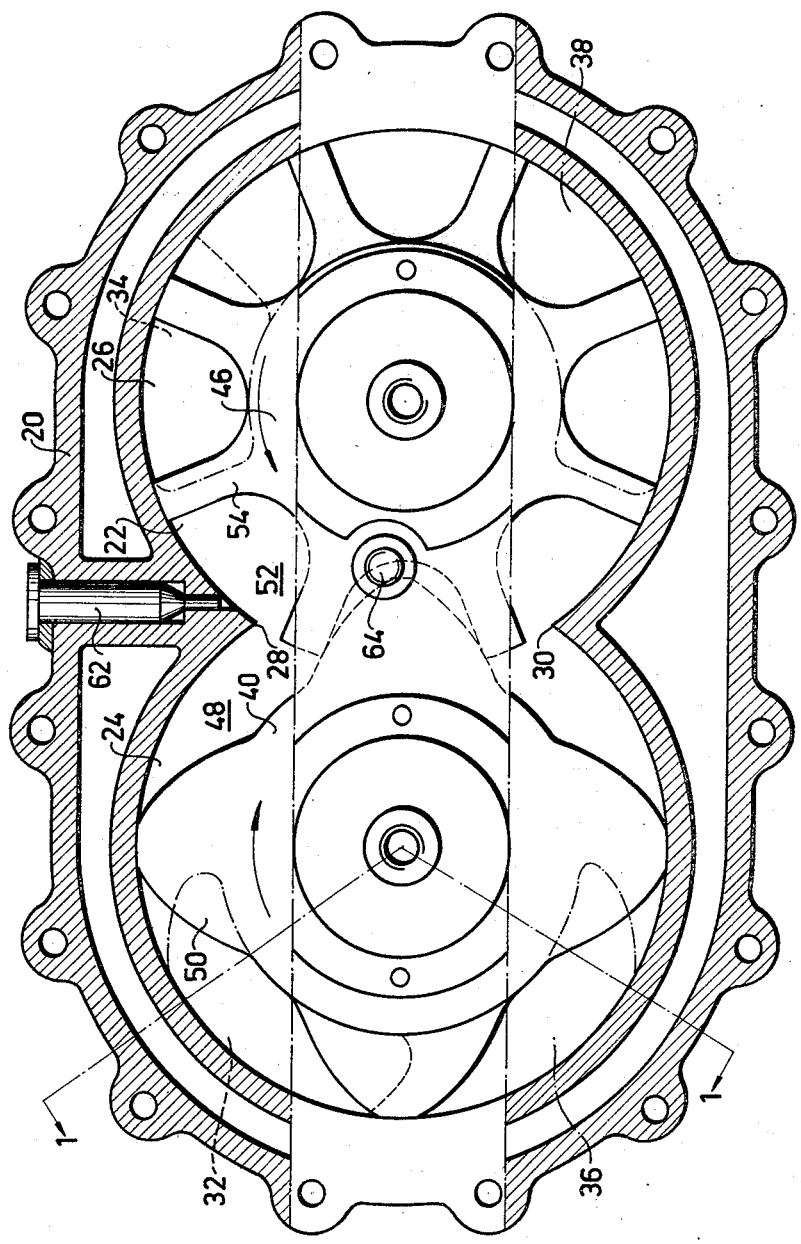
Figure 3:
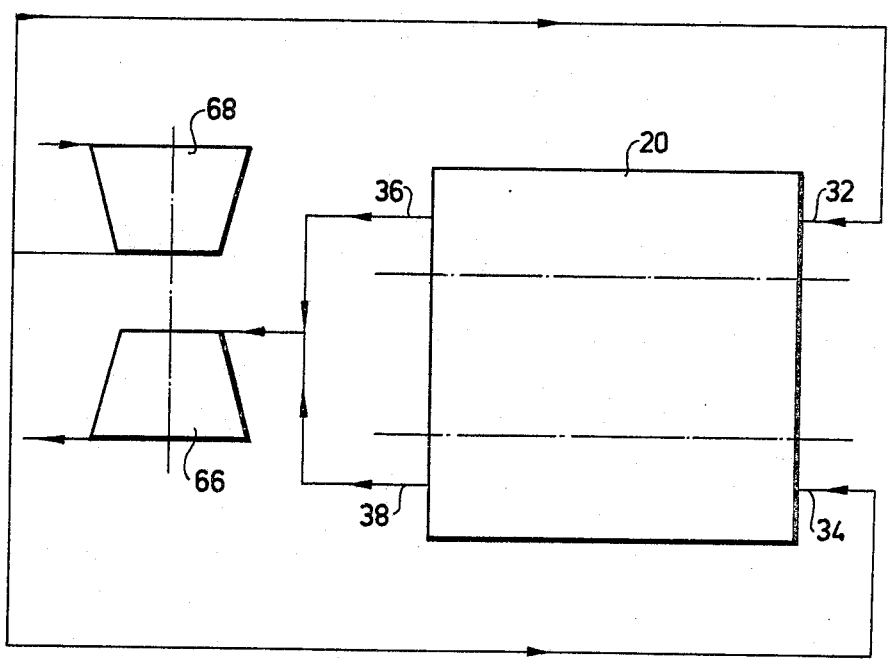
Figure 7:
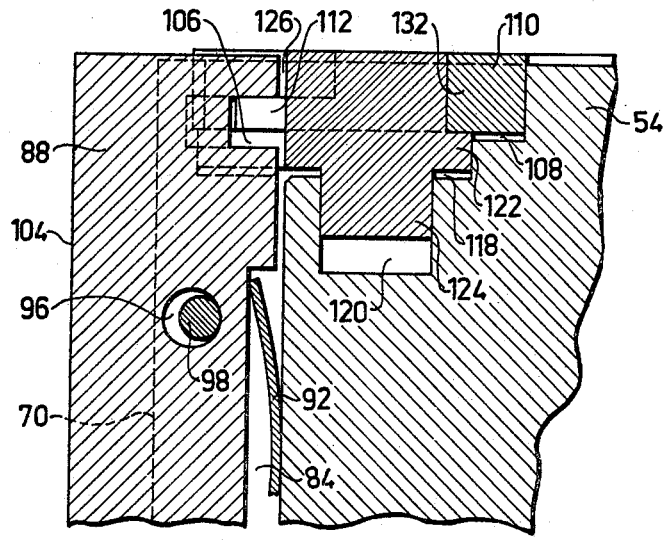
Figure 5:
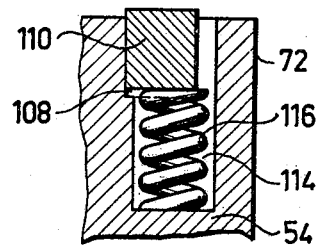
Figure 6:
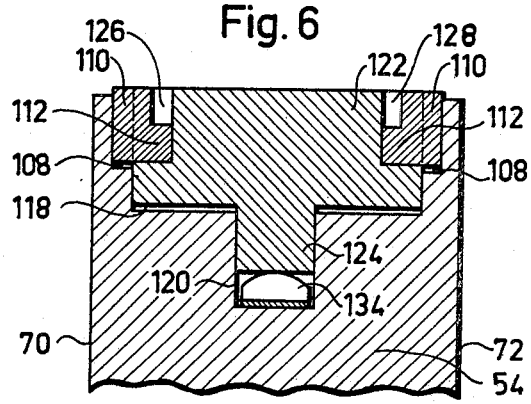

The invention will now be described more in detail in connection with an embodiment thereof shown in the accompanying drawings in which FIG. 1 is a longitudinal section taken along line 1—1 in FIG. 2,
FIG. 2 is a section taken along line 2—2 in FIG. 1,
FIG. 3 is a diagram showing the flow of the working fluid outside the working space of the engine,
FIG. 4 is a fragmentary end view of the secondary rotor,
FIG. 5 is a section taken along line 5—5 in FIG. 4,
FIG. 6 is a section taken along line 6—6 in FIG. 4,
FIG. 7 is a section taken along line 7—7 in FIG. 4,
FIG. 8 is a section taken along line 8—8 in FIG. 4,
FIG. 9 is a fragmentary end view of the primary rotor,
FIG. 10 is a section taken along line 10—10 in FIG. 9,
FIG. 11 is a section taken along line 11—11 in FIG. 9,
FIG. 12 is a section taken along line 12—12 in FIG. 9,
FIG. 13 is a section taken along line 13—13 in FIG. 9,
FIG. 14 is a fragmentary view taken along line 14—14 in FIG. 13 and
FIG. 15 is a section taken along line 15—15 in FIG. 13.

The engine shown comprises a casing 20, forming a first member of the engine, enclosing a working space 22 consisting of two cylindrical bores 24, 26 having parallel axes and intersecting along two straight axially extending lines 28, 30. The casing 20 has two separate axial inlet channels 32, 34, one communicating with each bore 24, 26. Fresh air for scavenging and charging the engine is supplied through the inlet channels 32, 34 and exhaust gas is removed from the engine through the outlet channels 36, 38. A primary rotor 40, forming a second member of the engine, is carried in bearings 42, 44 so as to be coaxially mounted in the bore 24 which communicates with the channels 32 and 36. A secondary rotor 46, forming a third member of the engine, is, in the same way, coaxially mounted in the bore 26 which communicates with the channels 34 and 38.

The primary rotor 40 is generally cylindrical around its axis and its provided with four straight grooves 48 in its cylindrical surfaces with intervening lands 50. The secondary rotor 46 is generally cylindrical around its axis and is provided with eight straight grooves 52 in its circular surface with intervening lands 54. The two rotors 40, 46 are fitted with a synchronizing gear located outside the working space 22 and comprising one gear 56, 58 nonrotatably connected with each of the rotors 40, 46. The primary rotor 40 is further provided with an external stub shaft 60 for transmission of power from the engine.

An injection nozzle 62 (see FIG. 2) for supplying fuel in the form of combustible liquid obtained from a pressure liquid source, not shown, into the working space 22 is located in the casing 20 in such a place that the liquid is injected into a groove 52 of the secondary rotor 46 after that said groove 52 has been moved out of communication with the corresponding inlet channel 34 and before the mating land 50 of the primary rotor 40 enters said groove 52.

Means, in the form of a spark plug 64, for igniting the combustible fuel mixture is provided in at least one end wall of the casing 20 and located within an area thereof facing the working space in an angular position of the rotors 40, 46 in which the free space of the groove 52 in a plane transverse to the axes of the rotors is limited only by the flanks of the groove 52 and of the mating land 50. Preferably the spark plug 64 is locted in an area of the end wall limited by the flanks of the groove 52 and the land 50 when said groove and land are in or close to their maximum intermesh position.

The outlet channels 36, 38 from the working space 22 communicate with a turbine 66 driven by the exhaust gases. The turbine 66 is connected with a blower 68 acting as a scavenging pump communicating with the inlet channels 32, 34 to the working space 22 (FIG. 3).

The details of the primary and secondary rotors 40, 46 will now be discussed more in detail in conjunction with FIGS. 4 to 15.

A groove 52 of the secondary rotor 46 (see FIG. 4) is provided with a leading flank 70 and a trailing flank 72 merging into each other to form the valley of the groove. The leading flank 70 comprises an inner portion 74 following a circular arc having its centre on the symmetrical line of the groove and an outer portion 76 forming a tangent to the inner portion and being parallel with a radius of the rotor drawn centrally through the adjacent land 54. The trailing flank 72 comprises correspondingly shaped inner and outer portions 78 and 80, respectively. A land 54 of the secondary rotor 46 is further provided with a crest 82 cylindrical around the axis of the rotor.

In the edge portion of each flank 70, 72 of the secondary rotor 46 there is an axially extending smoothly machined furrow 84, 86 in which a closely fitting sealing strip 88, 90 is located. In each furrow 84, 86 there is a wave spring 92, 94 acting upon the sealing strip 88, 90 and biasing the strip out of the furrow. A number of axially distributed openings 96 in the sealing strip 88 cooperates with pins 98 of smaller radial extent and fixed in the rotor 46 for restriction of the amount of projection. The projecting portion of the sealing strip 88, 90 is provided with a profile comprising one surface 100 parallel with the adjacent crest 82 and one surface 102 undercut with regard to a radial line from the axis of the rotor 46 thus providing an edge 104 at the outermost end of the sealing strip. Each sealing strip 88, 90 is further close to each end thereof provided with a notch 106 therein the function of which will be evident as this specification proceeds.

In each axial end surface of the secondary rotor 46 there are a number of smoothly machined apertures 108 each extending around a groove 52 and located adjacent to the flanks 70, 72 thereof. A sealing element 110 in the form of a continuous strip is located in each of said apertures 108 and closely fitting therein. The ends of the strip 110 are partly cut away leaving a tongue 112 extending into the notch 106 of the axial sealing strip 88, 90. A number of holes 114 are provided in the bottom of the aperture 108, each hole 114 enclosing a helical spring 116 biasing the strip 110 out of the aperture 108. In each end surface of each land 54 close to the crest 82 thereof there is a circular smoothly machined aperture 118 having such a width that it extends out into the apertures 108 and having a depth larger than the depth of the apertures 108. In the bottom of the aperture 118 there is a smoothly machined extension 120 thereof having a generally rectangular profile provided with rounded ends located generally along the diameter of the aperture 118 following a radial line from the axis of the rotor 46. A sealing element 122 of generally cylindrical form is located and closely fitting in the aperture 118 and provided with a projection 124 located and closely fitting in the extension 120 of the aperture 118. The element 122 is further provided with recesses 126, 128 in the barrel surface thereof for the sealing strips 88, 90 and with recesses 130, 132 in the projecting end surface thereof, each recess 130, 132 having a form corresponding to that of the apertures 108 and an axial depth coinciding with the height of the sealing strip 110. A spring 134 is located within the extension 120 of the aperture 118 acting on the sealing element 122 and biasing the sealing element 122 and the sealing strips 110 out of the aperture 118 and the apertures 108, respectively. The amount of projection is restricted by the tongues 112 located in the notches 106 of axial sealing strips 88, 90.

A land 50 of the primary rotor 40 (see FIG. 9) is provided with a leading flank 136 and a trailing flank 138 separated by a crest 140 cylindrical around the axis of the rotor 40. A groove 48 of the primary rotor 40 is further provided with a valley 142 separating the flanks 138, 140 of the adjacent lands which valley 142 is cylindrical around the axis of the rotor 40. The leading flank 136 follows an epicycloidal curve generated by the edge 104 of the sealing strip 88 located in the edge portion of the leading flank 70 of the cooperating groove 52 of the secondary rotor 46, whereas the trailing flank 138 follows a corresponding epicycloidal curve generated by the edge of the sealing strip 90 in the trailing flank 72 of the groove 52.

In the crest 140 of each land 50 of the primary rotor 40 there is an axially extending smoothly machined furrow 144 in which a closely fitting sealing strip 146 is located. In each furrow 144 there is a wave spring 148 acting upon the sealing strip 146 and biasing the strip out of the furrow. The strip 146 as well as the furrow 144 has a T-shaped profile thus restricting the amount of projection of the strip.

In each axial end surface of the primary rotor 40 there are a number of smoothly machined apertures 150 each extending along and located adjacent to a flank 136, 138 of a land 50. The apertures 150 extending along the different flanks 136, 138 of a land 50 intersect close to the crest 140 of the land. A sealing element 152 in the form of a continuous strip is located in each of said apertures 150 and closely fitting therein. The ends of the strips 152 extending out into the intersection area of the apertures 150 are partly cut away leaving a tongue on each strip which tongues cooperate to form a continuous sealing line around the crest portion of the land 50. A continuous annular, smoothly machined aperture 154 is provided in each end surface of the primary rotor 50 which aperture 154 is located radially adjacent to the valleys 142 of the grooves 48 and has a larger depth than the apertures 150 in the lands 50. Peripherally adjacent to each valley 142 there is a sealing element 156 located and closely fitting in the aperture 154. In each sealing element 156 there are recesses 158 forming extensions of the apertures 150 in the lands 50 and having an axial depth coinciding with the height of the strip 152, which recesses 158 enclose the ends of the corresponding sealing strips 152. In the surface of sealing element 156 facing the bottom of the aperture 154 there are two holes 160, each enclosing a helical spring 162 biasing the sealing element 156 and the sealing strips 152 out of the aperture 154 and the apertures 150, respectively. In each end surface of each land 50 there are further two cylindrical, smoothly machined apertures 164, each extending over the complete width of one of the apertures 154 and having a larger depth than that of the aperture 154. In each of the cylindrical apertures 164 there is a cylindrical sealing element 166 closely fitting therein. A recess 168 is provided in the projecting end surface of the sealing element 166 which recess 168 has a form corresponding to that of the aperture 154 and an axial depth coinciding with the height of the sealing strip 156. The sealing strip 156 and the sealing element 166 are further connected by a pin 170 closely fitting in holes therein. A spring 174 is located in the aperture 164 acting on the sealing element 166 and biasing the sealing element 166 and the sealing strip 156 out of the aperture 164 and the aperture 154, respectively. A hole 174 passing transversely through the sealing element 166 cooperates with a pin 176 of smaller axial extent and fixed in the rotor 40 for restriction of the amount of projection.

The engine shown acts in the following way. At start the rotors 40, 46 are brought into rotation by external means, not shown. Fresh air is supplied from the blower 68 through the inlet channels 32, 34 to the inlet chambers composed of grooves 48, 52 in the rotors for scavenging and charging thereof and fuel is injected into the groove 52 by the injection nozzle 62. The air-fuel mixture is compressed in the working chamber formed by the grooves 48, 52 and is ignited therein by the spark plug 64 when the working chamber has reached its minimum volume. The combustion gas is expanded in the working chamber formed by the grooves 48, 52 and produces positive power. The exhaust gas is discharged from the outlet chambers composed of the grooves 48, 52 through the outlet channels 36, 38 to the turbine 66 for further expansion therein for drive of the blower 68. The grooves are then scavenged and charged once more and the cycle is repeated.

During this cycle the sealing strips 146 in the crests 140 of the lands 50 of the primary rotor 40 by the springs 148, by the centrifugal forces and by the gas pressure in the furrows 144 are brought into continuous contact with the barrel wall of the bore 24 from the intersection line 30 to the intersection line 28 thus preventing leakage along said barrel wall from the working chambers to the grooves 48 being charged and discharged, respectively. The sealing strips 146 are further by means of the gas pressure brought into sealing contact with the low pressure side of the cooperating furrows 144 so that leakage through the furrows 144 around the strips 146 is prevented. Owing to the T-shaped profiles of the furrows 144 and the strips 146 the projection of the strips 146 when passing from the intersection line 28 to the intersection line 30 is positively restricted. The sealing elements 156 in the end surfaces of the primary rotor 40 and located adjacent to the valleys 142 of the grooves 48 by the springs 162 are brought into continuous sealing contact with the end walls of the working space 22 during the complete cycle so that leakage radially from the grooves 48 along said end walls is prevented. The sealing elements 152 in the end surfaces of the lands 50 of the primary rotor 40 by the springs 162 and 172 and by the gas pressure in the apertures 150 are brought into continuous sealing contact with the end walls of the working space 22 except for when passing the ports therein communicating with the inlet and outlet channels 32, 36 so that leakage peripherally from the working chambers along said end walls is prevented. Leakage along the apertures 150 below the sealing elements 152 is restricted by the sealing elements 156, 166 which positively close the leakage spaces between the bottoms of the apertures 150 and the inner surfaces of the sealing elements 152 and also owing to the fact that they project into the cooperating apertures 154, 164, respectively, to a depth exceeding that of the apertures 150 do not bring about a corresponding leakage space along the bottom of the cooperating apertures 154, 164. The radially inner ends of the sealing elements 152 are continuously in contact with the end walls of the working space 22 and the projection of the radially outer ends thereof is restricted by the pins 170, 176 connecting the sealing elements 152 and the cylindrical sealing elements 166 and the cylindrical sealing element 166 and the rotor 40, respectively.

The sealing strips 88, 90 in the edges of the flanks 70, 72 of the grooves 52 of the secondary rotor 46 have a double function. By the springs 92, 94 by the centrifugal forces and by the gas pressure in the furrows 84, 86 the strips 88, 90 are brought into continuous contact with the barrel wall of the bore 26 from the intersection line 30 to the intersection line 28 thus leakage along said barrel wall from the working chambers to the grooves 52 being charged and discharged, respectively. The sealing strips 90 in the trailing flanks 72 of the grooves 52 further sealingly cooperate with the trailing flanks 138 of the cooperating land 50 of the primary rotor 40 from the intersection line 28 to the position of the land 54 of the secondary rotor 46 enclosing the strip 90 in which the land 54 is in maximum intermesh with the corresponding groove 50 of the primary rotor 40 thus preventing leakage along the flank 72 from one working chamber to another. The sealing strips 88 in the leading flanks 70 of the grooves 52 correspondingly further sealingly cooperate with the leading flank 136 of the cooperating land 50 of the primary rotor 40 from the position of the land 54 of the secondary rotor 46 enclosing the strip 88 in which the land 54 is in maximum intermesh with the corresponding groove 50 of the primary rotor 40 to the intersection line 30 thus preventing leakage along the flank 70 from one working chamber to another. Owing to the opening 96 in the strips 88, 90 and the pins 98 in the rotor 46 the projection of the strips 88, 90 when out of contact with anyone of the other members 20, 40 of the engine is positively restricted. The sealing elements 110 in the end surfaces of the secondary rotor 46 by the springs 116, 134 and by the gas pressure in the apertures 108 are brought into continuous sealing contact with the end walls of the working space 22 except for when passing the ports therein communicating with the inlet and outlet channels 34, 38 so that leakage from the working chambers along said end walls is prevented. The radially innermost portions of the sealing elements 110 are continuously in contact with the end wall of the working space 22 and the projection of the radially outermost portions thereof is restricted by the tongues 112 extending into the notches 106 in the sealing strips 88, 90. The cylindrical sealing elements 122 in the end surfaces of the lands 54 of the secondary rotor 46 are in continuous sealing contact with the end walls of the working space 22 except when passing the ports therein communicating with the inlet and outlet channels 34, 38 so that leakage radially between the sealing elements 110 along said end walls is prevented. The projections 124 of the sealing elements 112 extending into the extension 120 of the cylindrical apertures 118 further prevent any leakage between the furrows 84, 86 enclosing the sealing strips 88, 90. The projection of the cylindrical sealing elements 122 is restricted by the contact between the cylindrical sealing elements 122 and the sealing elements 110 provided with the tongues 112 extending into the notches 106 of the sealing strips 88, 90.

It has to be observed that each working chamber all the time on one side thereof is bounded by two complete flanks 70, 72 of a groove 52 of the secondary rotor 46 whereas on the other side thereof the working chamber is bounded by varying portions of the flanks 136, 138 of the primary rotor 40. Those portions of the primary rotor flanks 136, 138 are separated by the contact with an edge 88, 90 of the female rotor groove 52. With regard to the sealing it is consequentially of utmost importance that the sealing strips 152 in the primary rotor land 50 all the time are located adjacent to the corresponding flank 136, 138 thereof whereas the sealing strips 110 in the secondary rotor 46 without too much damage may be on some distance from the corresponding flank 70, 72 as long as the radially outermost end of the strip 110 is located adjacent to said flanks 70, 72.

Each of the lines forming the perimeters of a compression expansion is thus continuously sealed during the complete period of existence thereof.

What is claimed is:

1. Internal combustion engine comprising three cooperating members one stationary and two revolving in relation to each other and to the stationary one around two parallel axes, a first of said members being provided to keep said axes of revolution on a fixed distance from each other and provided with two generally cylindrically formed surfaces, each of said surfaces having its axis coinciding with one of said axes of revolution, a second member being generally cylindrical around an axis coinciding with one of said axes of revolution and having a surface cooperating with the corresponding surface of the first member, said cooperating surface of the second member being provided with at least three grooves and intervening lands having generally convex flanks of substantially cycloidal type extending in axial direction, the third member being generally cylindrical around an axis coinciding with the second of said axes of revolution and having a surface cooperating with the corresponding surface of the first member, said cooperating surface of the third member being provided with a number of grooves and intervening lands exceeding that of the second member, said grooves having generally concave flanks extending in axial direction and having a radial extent exceeding that of the cooperating land of said second member, at least a portion of each of said flanks remote from the edge thereof being formed such that the groove is wider than the envelope developed by a land of said second member when passing into and out of mesh with said groove, as the members revolve, said members being shaped such that in sequence during the revolution a pair of grooves in said second and third members form inlet chambers, said inlet chambers merge into a common working chamber diminishing in volume to minimum value when the trailing land of said groove in the second member is in maximum intermesh with said groove in the third member, and thereafter increasing in volume to maximum volume and then being separated into a pair of outlet chambers, said working chamber being continually closed in axial direction by cooperating surfaces of said members, said engine being provided with means for charging said inlet chambers and discharging said outlet chambers and with means for supply of fuel, characterized in that each of the lines of cooperation among the members forming the perimeters of a working chamber is continuously sealed by sealing means movably located in one member and in biased direct contact with the cooperating surface of one of said further members.

2. Engine as defined in claim 1, in which axially extending sealing strips are located in furrows provided in the edge portions of said flanks of the third member said sealing strips being biased into contact with the cooperating flank of the second member.

3. Engine as defined in claim 2, in which said axially extending strip is also biased into contact with the cooperating cylindrical surface of the first member.

4. Engine as defined in claim 2, in which axially extending sealing strips are located in furrows provided in the crest portions of the lands of the second member, said sealing strips being biased into contact with the cooperating cylindrical surface of the first member.

5. Engine as defined in claim 2, in which axially extending sealing strips are located in furrows provided in the valleys of the grooves of the second member, said sealing strips being biased into contact with the cooperating crest portions of the lands of the third member.

6. Engine as defined in claim 1, in which the axially space between cooperating surfaces of two different members is positively sealed by sealing elements located in apertures provided in one of said surfaces and biased into direct contact with said other surface.

7. Engine as defined in claim 6, in which at least one of said second and third members is provided with sealing elements located in apertures provided in each of the axial end surfaces thereof, said sealing elements forming a continuous sealing line around said end surface.

8. Engine as defined in claim 7, in which means are provided for blocking a leakage flow within said apertures along the sealing elements located therein.

9. Engine as defined in claim 8, in which said apertures are provided with abrupt changes of the depth thereof and the sealing elements located in the deeper apertures project thereinto to a distance exceeding the depth of the adjacent shallower apertures.

10. Engine as defined in claim 8 or 9, in which each axially free end surface of a land is provided with sealing elements located in apertures provided in said surface.

11. Engine as defined in claim 10, in which said sealing elements extend radially from one end to the other of each flank.

12. Engine as defined in claim 11, in which said sealing elements at least in said second member are shaped correspondingly to the adjacent flank and located in close proximity thereto.

13. Engine as defined in claim 1, in which each of said sealing elements is biased into contact with the cooperating surface by means of springs.

14. Engine as defined in claim 13, in which each of said sealing elements are further biased into contact with the cooperating surface by pressure fluid.

References Cited

UNITED STATES PATENTS

| | | | |
|---|---|---|---|
| 2,691,482 | 10/1954 | Ungar. | |
| 3,275,226 | 9/1966 | Whitfield | 230—143 |
| 3,282,495 | 11/1966 | Walls | 230—143 |
| 3,437,263 | 4/1969 | Persson | 230—143 |

CORNELIUS J. HUSAR, Primary Examiner

U.S. Cl. X.R.

103—128; 230—143